(12) United States Patent
Taketa et al.

(10) Patent No.: US 10,723,087 B2
(45) Date of Patent: Jul. 28, 2020

(54) PREPREG AND METHOD FOR MANUFACTURING SAME

(71) Applicant: TORAY INDUSTRIES, INC., Tokyo (JP)

(72) Inventors: Ichiro Taketa, Ehime (JP); Shiori Kawamoto, Ehime (JP); Hiroaki Sakata, Ehime (JP)

(73) Assignee: Toray Industries, Inc., Tokyo (JP)

( * ) Notice: Subject to any disclaimer, the term of this patent is extended or adjusted under 35 U.S.C. 154(b) by 22 days.

(21) Appl. No.: 15/776,605

(22) PCT Filed: Dec. 22, 2016

(86) PCT No.: PCT/JP2016/088319
§ 371 (c)(1),
(2) Date: May 16, 2018

(87) PCT Pub. No.: WO2017/110991
PCT Pub. Date: Jun. 29, 2017

(65) Prior Publication Data
US 2018/0326676 A1     Nov. 15, 2018

(30) Foreign Application Priority Data
Dec. 25, 2015    (JP) .................................. 2015-253490

(51) Int. Cl.
*B29C 70/20*       (2006.01)
*B32B 5/24*       (2006.01)
(Continued)

(52) U.S. Cl.
CPC .............. *B29C 70/205* (2013.01); *B32B 1/00* (2013.01); *B32B 5/022* (2013.01); *B32B 5/12* (2013.01);
(Continued)

(58) Field of Classification Search
CPC ....... B29C 70/06; B29C 70/08; B29C 70/083; B29C 70/16; B29C 70/20–207;
(Continued)

(56) References Cited

U.S. PATENT DOCUMENTS

| 5,028,478 A * | 7/1991 | Odagiri ...................... C08J 5/24 |
| | | 428/327 |
| 5,413,847 A | 5/1995 | Kishi et al. |

(Continued)

FOREIGN PATENT DOCUMENTS

| JP | 01104624 A | 4/1989 |
| JP | 0741575 A | 2/1995 |

(Continued)

OTHER PUBLICATIONS

International Search Report and Written Opinion for International Application No. PCT/JP2016/088319, dated Mar. 14, 2017, 5 pages.

(Continued)

*Primary Examiner* — Z. Jim Yang
(74) *Attorney, Agent, or Firm* — RatnerPrestia (57) ABSTRACT

A prepreg includes a fiber layer containing unidirectionally arranged carbon fibers impregnated with a thermosetting resin and a resin layer existing on at least one side of the fiber layer and containing a thermosetting resin and a thermoplastic resin insoluble in the thermosetting resin. The prepreg contains carbon fibers having an areal weight of fibers of 120 to 300 g/m$^2$ and has a weight fraction of resin of 25 to 50 mass %. An extreme value frequency of a surface geometry along a straight line perpendicular to the fibers of the prepreg is 30 points/mm or less when the prepreg has been exposed, for 24 hours, to a temperature at which a coefficient of interlayer friction is the lowest. Using sheets of the prepreg which are laid up, the coefficient of interlayer friction of the prepreg is measured at 10° C. intervals in a (Continued)

temperature range of 40 to 80° C. under the conditions: a pulling speed of 0.2 mm/min, a perpendicular stress of 0.1 bar, and a pulling displacement of 1 mm. The prepreg is suitable for aircraft structural members that exhibits high impact strength as a fiber-reinforced plastic and has excellent drapeability when formed into a prepreg laminate which is made to conform to a three dimensional shape.

7 Claims, 4 Drawing Sheets (51) Int. Cl.
  B32B 27/28      (2006.01)
  B32B 27/38      (2006.01)
  B32B 27/34      (2006.01)
  B32B 27/08      (2006.01)
  B32B 5/02       (2006.01)
  C08J 5/24       (2006.01)
  C08J 5/04       (2006.01)
  B32B 1/00       (2006.01)
  B32B 5/12       (2006.01)
  B32B 5/26       (2006.01)
  B32B 27/12      (2006.01)
  B29K 105/08     (2006.01)
  B29K 307/04     (2006.01)

(52) U.S. Cl.
  CPC .............. B32B 5/24 (2013.01); B32B 5/26 (2013.01); B32B 27/08 (2013.01); B32B 27/12 (2013.01); B32B 27/286 (2013.01); B32B 27/34 (2013.01); B32B 27/38 (2013.01); C08J 5/042 (2013.01); C08J 5/24 (2013.01); B29K 2105/0881 (2013.01); B29K 2307/04 (2013.01); B32B 2250/03 (2013.01); B32B 2250/05 (2013.01); B32B 2250/40 (2013.01); B32B 2255/02 (2013.01); B32B 2255/26 (2013.01); B32B 2260/021 (2013.01); B32B 2260/023 (2013.01); B32B 2260/046 (2013.01); B32B 2262/106 (2013.01); B32B 2264/0264 (2013.01); B32B 2270/00 (2013.01); B32B 2307/516 (2013.01); B32B 2307/558 (2013.01); B32B 2307/718 (2013.01); B32B 2307/732 (2013.01); B32B 2605/18 (2013.01); C08J 2363/00 (2013.01)

(58) Field of Classification Search
  CPC ....... B29C 70/58; B29C 70/60; B29C 70/606; B29C 70/64; B32B 5/02; B32B 5/12; B32B 5/10; B32B 5/24; B32B 5/26; B32B 5/28; Y10T 428/24994; Y10T 428/249942–249946; Y10T 428/249948; Y10T 428/24995; Y10T 428/249952; Y10T 428/24124; Y10T 428/24132
  See application file for complete search history.

(56) References Cited

U.S. PATENT DOCUMENTS

| | | | |
|---|---|---|---|
| 5,599,612 A | 2/1997 | Muraki et al. | |
| 2003/0190452 A1* | 10/2003 | Lucas | B32B 27/12 428/116 |
| 2004/0030061 A1* | 2/2004 | McGrail | C08J 5/24 525/537 |
| 2005/0025948 A1* | 2/2005 | Johnson | E01C 9/086 428/223 |
| 2005/0075443 A1* | 4/2005 | Noguchi | C22C 49/14 524/495 |
| 2010/0092770 A1* | 4/2010 | Wadahara | B29C 70/20 428/339 |
| 2012/0328858 A1* | 12/2012 | Fujiwara | C08G 59/4021 428/213 |
| 2013/0129968 A1* | 5/2013 | Weidmann | B29C 70/202 428/113 |
| 2014/0147619 A1* | 5/2014 | Grankaell | B29C 70/30 428/113 |
| 2018/0002504 A1* | 1/2018 | Kawamoto | B32B 27/14 |
| 2019/0016063 A1* | 1/2019 | Newton | B29C 70/542 |
| 2019/0224925 A1* | 7/2019 | Hamlyn | B29C 70/345 |

FOREIGN PATENT DOCUMENTS

| | | |
|---|---|---|
| JP | 2003524666 A | 8/2003 |
| JP | 2006052385 A | 2/2006 |
| JP | 2008006814 A | 1/2008 |
| JP | 2008162154 A | 7/2008 |
| JP | 2016179647 A | 10/2016 |
| WO | 9606725 A1 | 3/1996 |
| WO | 2016111190 A1 | 7/2016 |

OTHER PUBLICATIONS

Extended European Search Report for European Application No. 16 878 878.4, dated Aug. 21, 2019, 12 pages.

Larberg et al., "On the interply Friction of Different Generations of Carbon/Epoxy Prepreg Systems", Composites: Part A 42 (2011)—pp. 1067-1074.

* cited by examiner

PREPREG AND METHOD FOR MANUFACTURING SAME

CROSS REFERENCE TO RELATED APPLICATIONS

This is the U.S. National Phase application of PCT/JP2016/088319, filed Dec. 22, 2016, which claims priority to Japanese Patent Application No. 2015-253490, filed Dec. 25, 2015, the disclosures of these applications being incorporated herein by reference in their entireties for all purposes.

TECHNICAL FIELD OF THE INVENTION

The present invention relates to a carbon-fiber-reinforced prepreg for obtaining a fiber-reinforced plastic.

BACKGROUND OF THE INVENTION

Fiber-reinforced plastics have excellent specific strength and specific stiffness, and thus their applications have been widely expanded to aircraft structural members, wind mill blades, and automobile outer panels, as well as computer applications including IC trays, laptop computer housings, and the like, and the demand is increasing year by year. In particular, carbon-fiber-reinforced composite materials are light in weight and have excellent strength and stiffness, and thus have been widely used in the aircraft industry, as typified by commercial aircrafts. In recent years, they are also used for large-sized structural members, such as main wings and bodies.

For such a structural member, a fiber-reinforced plastic laminate composed of prepreg sheets that have been laid up and then cured is often used. In a fiber-reinforced plastic laminate, carbon fibers are unidirectionally aligned, and thus the fiber volume content can be increased, whereby the high elastic modulus and strength of carbon fibers can be maximumly utilized. In addition, when the prepreg is impregnated with a high-performance resin while reducing variation in areal weight, the obtained fiber-reinforced plastic laminate has stable quality. However, a fiber-reinforced plastic laminate has a drawback in that delamination tends to occur between the prepreg layers upon the impact of a foreign substance from out of the plane. The occurrence of delamination leads to a decrease in the compression strength of the structural member, and thus compressive strength after impact (CAI) has long since been a design constraint issue in the designing of aircrafts, and the enhancement of CAI has been the most important issue in the material designing of fiber-reinforced plastics. Against such a background, Patent Document 1 proposes a prepreg on the surface of which a thermoplastic resin formed into fine particles is localized. Sheets of such a prepreg which are laid up and formed into a fiber-reinforced plastic laminate can have a highly toughened thermoplastic resin localized between the layers, have a reduced area of delamination upon the application of out-of-plane impact, and have an enhanced CAI. Currently, such an "increased-interlayer-toughness" prepreg has been mainly applied to fiber-reinforced plastics used for primary structural members of aircrafts.

It is known that, of the steps of producing a structural member, the shaping step, in which prepreg is made to conform to a three dimensional shape of interest and formed into a preform before the forming/curing step using an autoclave or the like, is an important step that influences the success or failure in material quality. When prepreg layers are shaped layer by layer, a high-quality preform can be obtained, but such a process is costly and also takes a long period of time. Then, in order to enhance the production efficiency, a shaping method called hot-forming, in which prepreg sheets are previously laid up in planar form into a prepreg laminate at high speed using an automatic machine, and then the prepreg laminate is shaped into a three dimensional shape while heat is applied thereto, is used. Patent Document 2 discloses a shaping method in which a prepreg laminate is disposed between a mandrel and an expandable bladder, and the bladder is expanded, thereby pressing the laminate against the mandrel while bending the same.

PATENT DOCUMENTS

Patent Document 1: Japanese Patent Laid-open Publication No. 1-104624
Patent Document 2: WO 96/06725

SUMMARY OF THE INVENTION

According to the shaping method of Patent Document 2 described above, together with the bending deformation of each layer of the prepreg laminate, interlayer slippage occurs, whereby the base material conforms to the shape of interest. There has been a problem in that the bending deformation of each layer occurs prior to the progress of interlayer slippage, and thus the base material fails to conform to the shape, generating wrinkling on the preform. When the preform has wrinkles, dimensional irregularities derived from such wrinkles are taken over to the obtained member, resulting in a decrease in structural strength as a member, which leads to unstable quality.

In the light of the problems of the background art, an object of the present invention is to provide a prepreg that exhibits high impact strength when formed into a fiber-reinforced plastic suitable for an aircraft structural member, the prepreg having excellent drapeability when a prepreg laminate is made to conform to a three dimensional shape.

The present invention is configured in the following manner. In other words, it is a prepreg including: a fiber layer containing unidirectionally arranged carbon fibers impregnated with a thermosetting resin; and a resin layer existing on at least one side of the fiber layer and containing a thermosetting resin and a thermoplastic resin insoluble in the thermosetting resin; in which the prepreg contains the carbon fibers having an areal weight of fibers of 120 to 300 $g/m^2$ and has a weight fraction of resin of 25 to 50 mass %; and in which an extreme value frequency of a surface geometry along a straight line perpendicular to the fibers of the prepreg is 30 points/mm or less when the prepreg has been exposed, for 24 hours, to a temperature at which a coefficient of interlayer friction is the lowest; in which, using sheets of the prepreg which are laid up, the coefficient of interlayer friction of the prepreg is measured at 10° C. intervals in a temperature range of 40 to 80° C. under the conditions: a pulling speed of 0.2 mm/min, a perpendicular stress of 0.1 bar (0.1 bar is equal to 10 kPa), and a pulling displacement of 1 mm.

Another aspect of the prepreg according to the present invention is a prepreg including: a fiber layer containing unidirectionally arranged carbon fibers impregnated with a thermosetting resin; and a resin layer existing on at least one side of the fiber layer and containing a thermosetting resin and a thermoplastic resin insoluble in the thermosetting resin; in which the prepreg contains the carbon fibers having an areal weight of fibers of 120 to 300 g/m² and has a weight fraction of resin of 25 to 50 mass %; and in which a temperature at which a displacement of a punch is 15 min or more exists within a temperature range of 40 to 80° C., in which the displacement of the punch is measured at 10° C. intervals in a temperature range of 40 to 80° C., in which the displacement is caused after the punch comes into contact with a prepreg laminate and up to the time when wrinkling is generated on the prepreg laminate; in which the punch, which is in the shape of a hemisphere having a diameter of 30 mm, is pressed against the center of the prepreg laminate under an atmosphere temperature-controlled at a prescribed temperature, and pressed into the prepreg laminate such that the center of the punch passes through the center of the hole of a seat while the punch is pressed against the prepreg laminate; and in which the prepreg laminate, 150 mm square, is 16 sheets of the prepreg laid up in the form of $[45/0/-45/90]_{2S}$, sealed in a film which is being evacuated, and disposed on the seat, which has a hole having a diameter of 100 mm.

Furthermore, the method of producing a prepreg according to the present invention includes: obtaining a fiber layer containing unidirectionally arranged carbon fibers impregnated with a thermosetting resin; disposing, on at least one side of the fiber layer, a solid resin which is solid at 25° C. and has a viscosity of 10,000 Pa·s or less at 80° C.; and disposing, on the side on which the solid resin is disposed, a resin layer containing a thermosetting resin and a thermoplastic resin insoluble in the thermosetting resin; in which the obtained prepreg contains the carbon fibers having an areal weight of fibers of 120 to 300 g/m² and has a weight fraction of resin of 25 to 50 mass %.

According to the present invention, it is possible to obtain a prepreg which is capable of producing, with high productivity, a wrinkle-free preform without using a device having a special mechanism in a hot-forming shaping step where a planar prepreg laminate is directly made to conform to a three dimensional shape, and which is also used to obtain a fiber-reinforced plastic that exhibits high impact strength.

BRIEF DESCRIPTION OF THE DRAWINGS

FIG. 1a) is a cross-sectional view showing the measurement method for a coefficient of interlayer friction, and FIG. 1b) is a plan view showing the measurement method for a coefficient of interlayer friction.

DETAILED DESCRIPTION OF EMBODIMENTS OF THE INVENTION

The present inventors have conducted research for the purpose of improving the resistance to an out-of-plane impact load in a fiber-reinforced plastic obtained from a prepreg laminate. As described above, by localizing a thermoplastic resin between the layers of a prepreg laminate, the impact strength of the fiber-reinforced plastic can be improved. In this case, however, it has been found that the thermoplastic resin present between layers hinders the prepreg interlayer slippage, resulting in a decrease in drapeability. Accordingly, they have found that the object of the present invention described above can be solved when a prepreg is configured such that a fiber layer containing carbon fibers and a thermosetting resin and a resin layer containing a thermosetting resin and a thermoplastic resin insoluble in the thermosetting resin are laid up, and is also designed such that, when in the form of a prepreg laminate, the interlayer friction resistance between mutually adjacent prepreg layers is reduced. As a result, when the prepreg laminate is made to conform to a three dimensional shape, the bending deformation of each layer of the prepreg laminate and interlayer slippage are caused in a well-balanced manner, whereby wrinkling is suppressed. They have found that a fiber-reinforced plastic having high interlayer toughness, high mechanical properties, and less variation in quality can thus be obtained.

Specifically, it is a prepreg including: a fiber layer containing unidirectionally arranged carbon fibers impregnated with a thermosetting resin; and a resin layer existing on at least one side of the fiber layer and containing a thermosetting resin and a thermoplastic resin insoluble in the thermosetting resin; in which the prepreg contains the carbon fibers having an areal weight of fibers of 120 to 300 g/m² and has a weight fraction of resin of 25 to 50 mass %; and in which an extreme value frequency of a surface geometry along a straight line perpendicular to the fibers of the prepreg is 30 points/mm or less when the prepreg has been exposed, for 24 hours, to a temperature at which a coefficient of interlayer friction is the lowest; in which, using sheets of the prepreg which are laid up, the coefficient of interlayer friction of the prepreg is measured at 10° C. intervals in a temperature range of 40 to 80° C. under the conditions: a pulling speed of 0.2 mm/min, a perpendicular stress of 0.1 bar, and a pulling displacement of 1 mm. Methods of measuring the coefficient of interlayer friction and the extreme value frequency of a surface geometry will be described below.

The fiber layer according to the present invention contains unidirectionally arranged carbon fibers impregnated with a thermosetting resin.

As a carbon fiber, any type of carbon fiber may be used according to the intended use. However, in terms of interlayer toughness and impact resistance, carbon fibers having a tensile modulus of 230 to 400 GPa are preferable. In addition, in terms of strength, it is preferable to use carbon fibers having a tensile strength of 4.4 to 7.0 GPa because, as a result, a composite material having high stiffness and mechanical strength is obtained. In addition, high-strength high-elongation carbon fibers having a tensile strain of 1.7 to 2.3% are preferable. Accordingly, carbon fibers having all the following characteristics are the most suitable: a tensile modulus of at least 230 GPa, a tensile strength of at least 4.4 GPa, and a tensile strain of at least 1.7%.

As commercially available products of preferably used carbon fibers, "TORAYCA (registered trademark)" T1100G-24K, "TORAYCA (registered trademark)" T1100G-12K, "TORAYCA (registered trademark)" T800S-24K, "TORAYCA (registered trademark)" T800S-12K, "TORAYCA (registered trademark)" T300-3K, and "TORAYCA (registered trademark)" T700S-12K (all manufactured by Toray Industries, Inc.) can be mentioned, for example.

The thermosetting resin is not limited to a particular one, and should be a resin that undergoes a cross-linking reaction with heat to form an at least partial three-dimensional cross-linked structure. Examples of such thermosetting resins include an unsaturated polyester resin, a vinyl ester resin, an epoxy resin, a benzoxazine resin, a phenol resin, a urea resin, a melamine resin, and a polyimide resin. Modified products of these resins and resin mixtures of two or more kinds of resins are also usable. In addition, these thermosetting resins may be resins that are self-curable with heat, and it is also possible to blend such a resin with a hardener, an accelerator, or the like.

Among these thermosetting resins, epoxy resins are preferably used for their excellent balance of heat resistance, mechanical properties, and adhesiveness to carbon fibers. It is particularly preferable to use an epoxy resin whose precursor is a compound having amine, phenol, and a carbon-carbon double bond.

As epoxy resins whose precursors are amines, an aminophenol type epoxy resin, a glycidyl aniline type epoxy resin, and a tetra glycidyl amine type epoxy resin are preferably used. As glycidyl amine type epoxy resins, tetraglycidyl-diaminodiphenylmethane, triglycidyl-p-aminophenol, triglycidyl-m-aminophenol, triglycidyl aminocreosol, and the like can be mentioned. A tetra glycidyl amine type epoxy resin having an average epoxide equivalent weight (EEW) within a range of 100 to 115, which is a high-purity tetra glycidyl amine type epoxy resin, and an aminophenol type epoxy resin having an average EEW within a range of 90 to 104, which is a high-purity aminophenol type epoxy resin, are preferably used because they suppress volatile matters that may form voids in the obtained fiber-reinforced composite material. Tetraglycidyldiaminodiphenylmethane has excellent heat resistance and is preferably used as a resin for a composite material for a structural member of an aircraft.

In addition, as an epoxy resin using phenol as a precursor, a glycidyl ether type epoxy resin is preferably used. Examples of such epoxy resins include a bisphenol-A type epoxy resin, a bisphenol-F type epoxy resin, a bisphenol-S type epoxy resin, a phenol novolac type epoxy resin, a creosol novolac type epoxy resin, and a resorcinol type epoxy resin. Among them, a high-purity bisphenol-A type epoxy resin having an average EEW within a range of 170 to 180 and a high-purity bisphenol-F type epoxy resin having an average EEW within a range of 150 to 65 are particularly preferably used because they suppress volatile matters that may form voids in the obtained fiber-reinforced composite material.

A bisphenol-A type epoxy resin, a bisphenol-F type epoxy resin, and a resorcinol type epoxy resin, which are liquid at room temperature (25° C.), have low viscosity and thus are preferably used in combination with other epoxy resins.

On the other hand, a bisphenol-A type epoxy resin that is solid at room temperature (25° C.), as compared with a liquid bisphenol-A type epoxy resin, has a lower cross-linking density in the cured resin, and thus the toughness of the cured resin is higher, but the heat resistance is lower. Accordingly, in order to obtain a balance between toughness and heat resistance, such a resin is preferably used in combination with a glycidyl amine type epoxy resin, a liquid bisphenol-A type epoxy resin, or a bisphenol-F type epoxy resin.

A phenol novolac type epoxy resin and a creosol novolac type epoxy resin have high heat resistance and low water absorbency, and thus can form cured resins having high heat and water resistance. By using a phenol novolac type epoxy resin and a creosol novolac type epoxy resin, the tackiness properties and draping properties of the prepreg can be adjusted while enhancing the heat and water resistance.

An epoxy resin having a naphthalene skeleton forms a cured resin having low water absorbency and high heat resistance. In addition, a biphenyl type epoxy resin, a dicyclopentadiene type epoxy resin, a phenolaralkyl type epoxy resin, and a phenyl fluorene type epoxy resin also form cured resins having low water absorbency, and thus can be preferably used.

A urethane modified epoxy resin and an isocyanate modified epoxy resin form cured resins having high fracture toughness and elongation, and thus can be preferably used.

In addition, an epoxy resin whose precursor is a compound having a carbon-carbon double bond is also preferably used as a thermosetting resin. Examples of such epoxy resins include alicyclic epoxy resins. They are characterized by having particularly high heat resistance when formed into cured resins. In particular, because alicyclic epoxies that are liquids at room temperature (25° C.) have a low viscosity, they are preferably used in combination with other epoxy resins.

These epoxy resins may be used alone, or may also be blended and used. When an epoxy resin having a bifunctional, trifunctional, or higher-functional group is added to a resin composition, the resulting prepreg can satisfy various characteristics such as workability, processability, and heat resistance under wetting conditions which is required for the fiber-reinforced complex; therefore, this is preferable. In particular, a combination of a glycidyl amine type epoxy resin and a glycidyl ether type epoxy resin can enhance processability, heat resistance, and water resistance. In addition, blending at least one epoxy resin that is liquid at room temperature with at least one epoxy resin that is solid at room temperature is effective in imparting both preferred tackiness properties and draping properties to the prepreg.

A hardener for the epoxy resin may be any compound having an active group that is capable of reacting with an epoxy group. Among others, a compound having an amino group, an acid anhydride group, or an azido group is preferable as a hardener. More specific examples of hardeners include various isomers of dicyandiamide, diaminodiphenylmethane, and diaminodiphenyl sulfone, amino benzoic acid esters, various acid anhydrides, phenol novolac resins, creosol novolac resins, polyphenols, imidazole derivatives, aliphatic amines, tetramethylguanidine, thiourea added amines, carboxylic acid anhydrides such as methyl hexahydrophthalic acid anhydrides, carboxylic acid hydrazides, carboxylic acid amides, polymercaptans, boron trifluoride ethylamine complexes, other Lewis acid complexes, and the like. These hardeners may be used alone or in combination.

By using an aromatic diamine as a hardener, a cured resin having excellent heat resistance can be obtained. In particular, various isomers of diaminodiphenyl sulfone form cured resins having excellent heat resistance, and thus are the most preferable. It is preferable that the amount of a hardener added is a stoichiometrically equivalent amount with respect to an epoxy resin. However, in some cases, the amount used is about 0.7 to 0.9 equivalents of the epoxy resin, whereby a cured resin having a high elastic modulus can be obtained.

In addition, by using a combination of imidazole or dicyandiamide with a urea compound (e.g., 3-phenol-1,1-dimethylurea, 3-(3-chlorophenyl)-1,1-dimethylurea, 3-(3,4-dichlorophenyl)-1,1-dimethylurea, 2,4-toluene bisdimethylurea, or 2,6-toluene bisdimethylurea) as a hardener, whereas curing occurs at a relatively low temperature, high heat resistance and water resistance can be achieved. In cases where an acid anhydride is used as a hardener, as compared with the case of using an amine compound, a cured resin having relatively lower water absorbency is obtained. Further, by using a substance that may form one of these hardeners, such as a microencapsulation substance, the preservation stability of the prepreg can be enhanced. In particular, the tackiness properties and draping properties are less likely to change even when the prepreg is allowed to stand at room temperature.

In addition, a product resulting from the partial preliminary reaction of the epoxy resin, the hardener, or both of them may also be added to the composition. This method is effective in viscosity adjustment or preservation stability improvement.

A thermoplastic resin is blended with the thermosetting resin used in the present invention. It is preferable that such a thermoplastic resin is a thermoplastic resin having a bond selected from a carbon-carbon bond, an amide bond, an imide bond, an ester bond, an ether bond, a carbonate bond, a urethane bond, a thioether bond, a sulfone bond, and a carbonyl bond. The thermoplastic resin may also partially have a cross-linked structure. In addition, it is also possible that the thermoplastic resin has or does not have crystallinity. In particular, it is preferably at least one kind of resin selected from the group consisting of polyamides, polycarbonates, polyacetals, polyphenyleneoxides, polyphenylenesulfides, polyarylates, polyesters, polyamideimides, polyimides, polyetherimides, polyimides having a phenyltrimethylindan structure, polysulfones, polyethersulfones, polyetherketones, polyetheretherketones, polyaramides, polyethernitriles, and polybenzimidazoles. Preferable examples of thermoplastic resins used for the fiber layer include those which dissolve in thermosetting resins.

These thermoplastic resins may be commercially available polymers, or may also be so-called oligomers having a molecular weight lower than that of the polymers. As oligomers, oligomers having a functional group reactive with the thermosetting resin at the terminal or in the molecular chain are preferable.

In cases where a blend of a thermosetting resin and a thermoplastic resin is used, as compared with the case of using only either of them, the brittleness of the thermosetting resin can be covered with the toughness of the thermoplastic resin, while the difficulty in forming of the thermoplastic resin can be covered with the thermosetting resin. As a result, the blend can serve as a well-balanced resin composition. In terms of balance, it is preferable that the ratio (part by mass) between the thermosetting resin and the thermoplastic resin is within a range of 100:2 to 100:50, more preferably within a range of 100:5 to 100:35.

The resin layer in the present invention contains a thermosetting resin and a thermoplastic resin insoluble in the thermosetting resin. Here, the "thermoplastic resin insoluble in the thermosetting resin" means that when the surface of the cured resin obtained by curing a composition containing a thermosetting resin and a thermoplastic resin is ground until the thermoplastic resin is exposed to the surface, and the surface is observed using an optical microscope, a clear interface can be observed between the thermosetting resin and the thermoplastic resin. Meanwhile, in cases where there is no clear interface between the thermoplastic resin and the surrounding thermosetting resin, and they cannot be distinguished from each other, the thermoplastic resin is considered to have dissolved in the thermosetting resin.

As thermosetting resins used for the resin layer, the same kinds of resins as the thermosetting resins exemplified above as those for the fiber layer can be used.

Here, the thermoplastic resin used for the resin layer is not limited to any resin species, and a thermoplastic resin having a glass transition temperature within a range of 80° C. to 180° C. is preferable. A thermoplastic resin having such a relatively high glass transition temperature does not undergo deformation during heating and curing. Thus, the resulting fiber-reinforced composite material obtained by curing a prepreg laminate has stable interlayer thickness and also has excellent interlayer toughness. At the same time, compression strength under wet-heat can be stabilized. In cases where the glass transition temperature of a thermoplastic resin is less than 80° C., the balance between interlayer toughness and compression strength under wet-heat is lowered in the resulting fiber-reinforced composite material. Meanwhile, in cases where the glass transition temperature is more than 180° C., the toughness of the thermoplastic resin itself tends to be insufficient. At the same time, the interfacial adhesiveness between the thermoplastic resin and the matrix resin becomes insufficient, resulting in a fiber-reinforced composite material having lower interlayer toughness.

As thermoplastic resins, those insoluble in a thermosetting resin constituting the resin layer can be used from among the various thermoplastic resins exemplified above as those for the fiber layer. Among them, polyamide significantly improves the impact resistance, and thus is the most preferable. Among polyamides, Nylon 12, Nylon 6, Nylon 11, Nylon 10, Nylon 6/12 copolymers, and a nylon modified to have a semi-IPN (macromolecular interpenetrating network structure) with an epoxy compound (semi-IPN nylon) described in Example 1 of Japanese Patent Laid-open Publication No. 1-104624 have particularly excellent adhesive strength with a thermosetting resin. Therefore, the delamination strength as a fiber-reinforced plastic is high, and the improving effect on impact resistance is also high. Thus, such polyamides are preferable.

That a resin layer exists on at least one side of the fiber layer means that a resin layer is layered on one side or both sides of the fiber layer. The resin layer may be placed on only one side of the prepreg surface or may also be placed on both sides. In addition, another layer, for example, a solid epoxy resin layer or the like mentioned below, may further be included between the fiber layer and the resin layer.

The thermoplastic resin insoluble in the thermosetting resin may be in the form of a nonwoven fabric or fibers. However, in order to obtain a fiber-reinforced composite material that develops high impact strength, particles are preferable. When the thermoplastic resin is in the form of particles, at the time of interlayer slippage, the physical relationship of thermoplastic resin particles can be changed. Therefore, as compared with the form of a nonwoven fabric or fibers, the coefficient of interlayer friction can be more reduced. The particle shape may be any one of spherical, nonspherical, porous, needle-like, whisker-like, and flaky, but a spherical shape is particularly preferable.

The areal weight of carbon fibers contained in the carbon fibers contained in the prepreg of the present invention is 120 to 300 g/m$^2$, still more preferably 140 to 280 g/m$^2$. Here, "areal weight of fibers" is the mass of carbon fibers contained per unit area of the prepreg. In cases where the areal weight of fibers is less than 120 g/m$^2$, a larger number of laid-up layers are required in order to obtain a fiber-reinforced plastic with a desired thickness, resulting in increasing the number of production steps. Meanwhile, in cases where the areal weight of fibers is more than 300 g/m$^2$, the resin is difficult to impregnate into fibers. As a result, non-impregnated parts remain as voids in the fiber-reinforced plastic formed using the fibers, which may lead to the deterioration of physical properties.

In the prepreg of the present invention, the weight fraction of resin is 25 to 50 mass %, more preferably 30 to 40 mass %. Here, the "weight fraction of resin" is the proportion of the total resin component excluding carbon fibers relative to the total mass of the prepreg. When the weight fraction of resin is more than 50 mass %, the fiber content is reduced. As a result, when the prepreg is used to form a fiber-reinforced plastic, the strength and elastic modulus are low. In addition, when the weight fraction of resin is less than 25 mass %, particularly in the configuration of the present invention where a resin layer is provided on the prepreg surface, the resin amount in the fiber layer is small, making it impossible to completely cover the fiber surface with the resin. As a result, cracking is likely to occur between fibers, whereby unexpected fracture may be caused, or quality variation may also increase.

In the prepreg of the present invention, an extreme value frequency of a surface geometry along a straight line perpendicular to the fibers is 30 points/mm or less when the prepreg has been exposed, for 24 hours, to a temperature at which a coefficient of interlayer friction is the lowest, in which, using sheets of the prepreg which are laid up, the coefficient of interlayer friction is measured at 10° C. intervals in a temperature range of 40 to 80° C. under the conditions: a pulling speed of 0.2 mm/min, a perpendicular stress of 0.1 bar, and a pulling displacement of 1 mm. In cases where the extreme value frequency is more than 30 points/mm when the prepreg laminate is made to conform to a three dimensional shape, interlayer slippage is unlikely to occur, resulting in wrinkling, even if shaping is performed at a temperature at which the coefficient of interlayer friction is the lowest.

Figure 1:
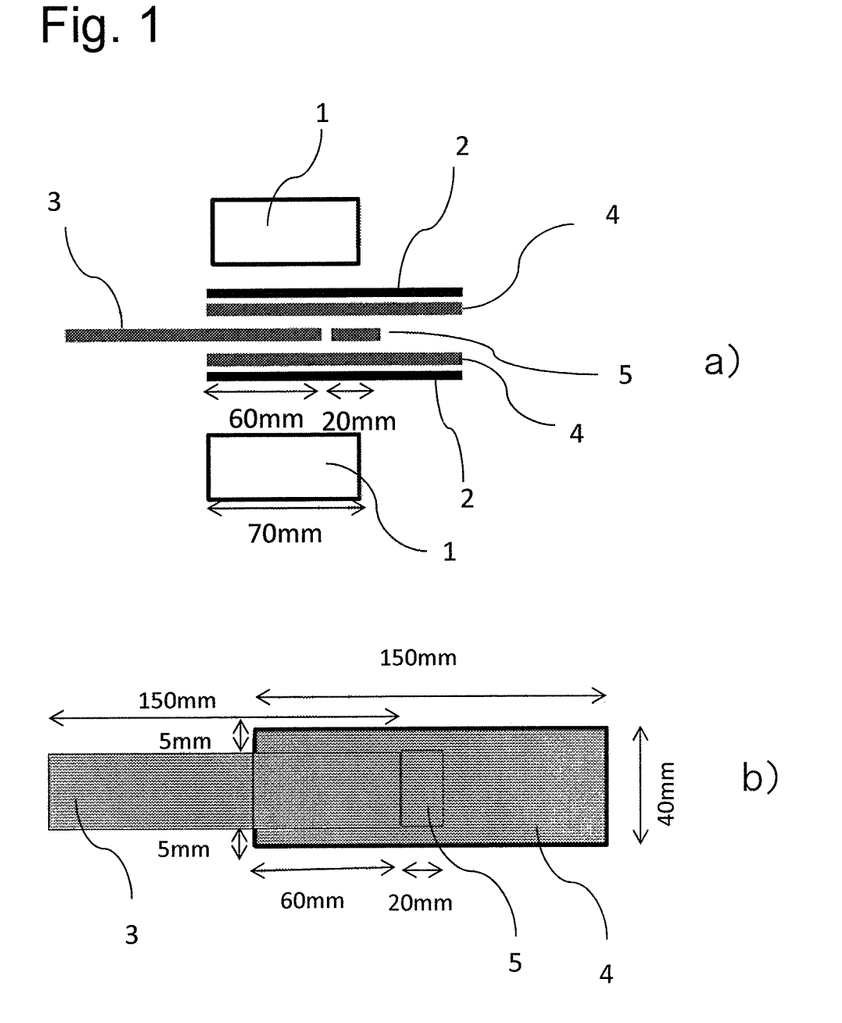

Here, the coefficient of interlayer friction means a coefficient of friction that occurs between prepreg layers in a prepreg laminate composed of laid-up sheets of the prepreg. In the present invention, the coefficient of interlayer friction is determined in the following manner. As shown in FIG. 1, one prepreg sheet 3 is sandwiched between two prepreg sheets 4, and, from out of the prepreg plane, a predetermined load is perpendicularly applied to the prepreg using a pressure plate 1. The details will be described below. Under these conditions, the load obtained when the sandwiched prepreg 3 is pulled out (pulling load) is divided by twice the load perpendicularly pressed from out of the prepreg plane (perpendicular load), and the obtained value is taken as the coefficient of interlayer friction. The reason why twice the load is used for the division is that both sides of the prepreg 3 to be measured receive the frictional resistance. As the test method, a prepreg is cut into a shape elongated in the fiber direction, and three prepreg sheets, a prepreg sheet 3 and prepreg sheets 4, are laid up to have the same fiber direction such that they overlap in an area having a width of 30 mm (perpendicular to the fiber direction) and a length of 60 mm (fiber direction). A spacer 5 is cut out of the same prepreg as the prepreg 4 such that the spacer has the same fiber direction and is 30 mm wide and 20 mm long, and the spacer 5 is disposed to contact the overlapping parts of the prepreg 4 at the center. As the prepreg 3 is pulled out, the area of the overlapping parts decreases, and the region pressurized with the pressure plate 1 is biased. As a result, the pressure plate 1 may contact unevenly, whereby a high load is locally applied. For this reason, the spacer 5 is disposed opposite to the pulling direction, thereby preventing the pressure plate 1 from being inclined. To the overlapping parts and a 10-mm-long area of the spacer 5 (an area having a width of 30 mm and a length of 70 mm), a constant perpendicular load of 21 N is continuously applied throughout the test while controlling the temperature at a prescribed temperature with the pressure plate 1 having a heating source. At the start of the test, the load of 21 N converted into a perpendicular stress is 0.1 bar. After 10 minutes from the start of perpendicular load application to the prepreg, the central prepreg layer 3 is pulled out at a pulling speed of 0.2 mm/min in the fiber direction, and the pulling load is measured. The pulling load is divided by twice the perpendicular load (18 N at the start of the test) applied to the overlapping parts (an area having a width of 30 mm and a length of 60 mm at the start of the test), and taken as the coefficient of interlayer friction. Here, together with the pulling out, the area of the overlapping part of the central prepreg layer that receives the perpendicular load decreases. Therefore, assuming that the sum of the area of the overlapping part with a pulling displacement taken into account (width: 30 mm, length: (60 mm–the pulling displacement)) and the area of the part that receives the load from the spacer (width: 30 mm, length: 10 mm) receives a 21 N load, the perpendicular load applied to the overlapping part is proportionally calculated, and the pulling load is divided by twice the perpendicular load and taken as the coefficient of interlayer friction. The coefficient of interlayer friction varies with the temperature, the pulling speed, and the perpendicular stress. Therefore, in the present invention, the coefficient of interlayer friction is measured after 5 minutes from the start of pulling out, that is, at a pulling displacement of 1 mm, under the conditions: a pulling speed of 0.2 mm/min; and a perpendicular stress of 0.1 bar at the start of the test. The measurement is performed five times, and the average is taken as the coefficient of interlayer friction. In a shaping step, a prepreg laminate may be sealed off and shaped under vacuum, but in reality there are much fewer cases in which a perpendicular stress of no less than 1 bar is applied, and because deformation performance at a perpendicular stress of about $\frac{1}{10}$ thereof is important, a coefficient of interlayer friction at 0.1 bar is used as a representative value.

In this manner, a coefficient of interlayer friction is measured at 10° C. intervals in a temperature range of 40 to 80° C., and a temperature at which the coefficient of interlayer friction is the lowest is determined.

Figure 2:
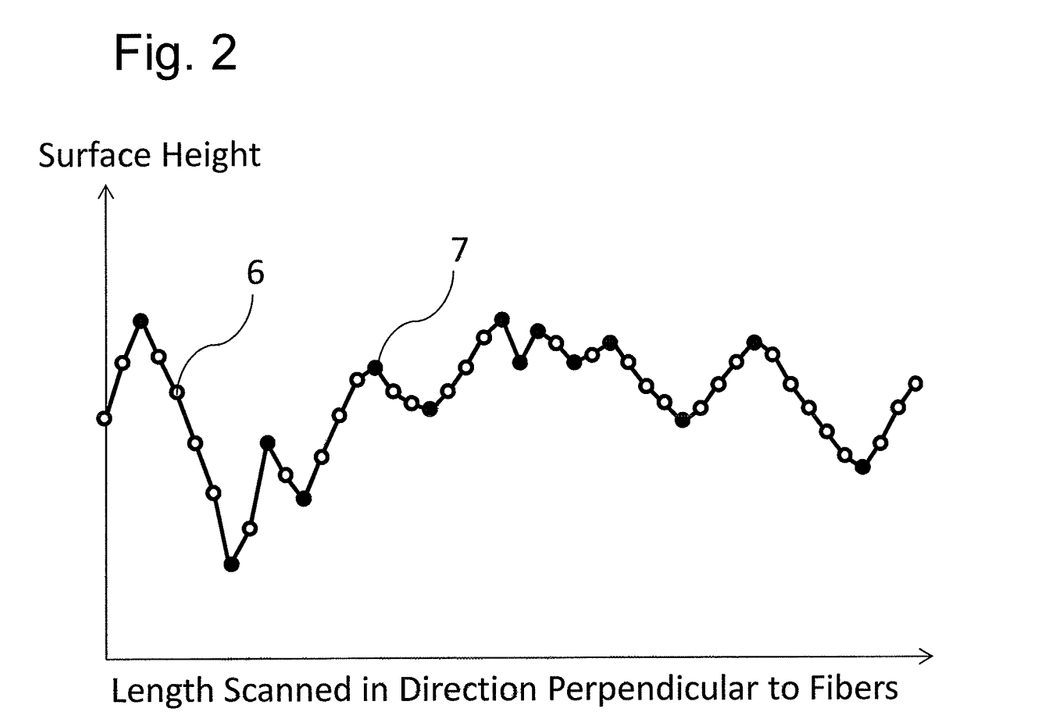
FIG. 2 is a schematic view showing an example of the surface height obtained when the prepreg surface according to the present invention was scanned along a straight line perpendicular to the fiber direction.

Using a prepreg which has been exposed to a prescribed temperature for 24 hours, the value of an extreme value frequency of a surface geometry along a straight line perpendicular to the fibers is measured in accordance with the following procedures. Five sheets, each having a 20 mm square size, are cut out of a prepreg substantially evenly in the cross direction such that the sheets include both ends of the prepreg, and the release paper is peeled off. In an oven in which the temperature is controlled at a temperature at which the coefficient of interlayer friction determined as above-mentioned is the lowest, the cut-out five sheets of the prepreg are exposed for 24 hours, the face from which the release paper has been peeled off being the upper side, and then the sheets are cooled to room temperature without contacting the surfaces of the prepreg sheets. Subsequently, an optical microscope is used to observe those surfaces of the prepreg from which the release paper has been peeled off. The surfaces of the prepreg sheets are linearly scanned in a direction perpendicular to the direction in which the reinforced fibers are oriented, and thus a height profile of the surface is obtained as shown in FIG. 2. The length of the straight line to be measured is in a range of 1 mm 0.2 mm, and the scanning spacing is 1 μm±0.2 μm. This is carried out five times on each of the prepreg sheets having a 20 mm square size, and 25 measurements in total are made. As shown in FIG. 2, the scanned points 6 are obtained in the scanning direction; the points at which the increase and decrease in surface height turn inversely are treated as extreme values 7; and the number of the extreme values 7 is divided by the scanning length to determine the number per 1 mm of the extreme values. The number per 1 mm of the extreme values which has been determined from the 25 measurements in total is averaged to determine the extreme value frequency of the surface geometry.

This parameter has the following meaning. In shaping the prepreg laminate, the shaping is carried out under a selected temperature condition under which the coefficient of interlayer friction is low, in order to facilitate interlayer slippage and suppress wrinkling. The form of the prepreg surface changes when the temperature is controlled prior to shaping the prepreg laminate and also changes while the prepreg laminated is shaped. The prepreg laminate includes a heat insulating layer, such as air, and thus it often takes time to control the temperature at the desired temperature for shaping. Owing to this, the prepreg laminate may be exposed, for a long time before shaping, to a temperature suitable for shaping. In such a case, an increase in the extreme value frequency of the surface geometry means that the smoothness of the prepreg surface is lost over time. A reason for this is considered to be that the thermosetting resin contained in the resin layer shifts into the fiber layer, and thus the thermoplastic resin, the solid hardener, and the like contained in the resin layer are exposed out of the prepreg surface, resulting in forming convex parts. When a prepreg not having a smooth surface is shaped, interlayer slippage in the prepreg laminate is inhibited, and therefore a prepreg having a smooth surface during shaping is preferable as a prepreg having excellent drapeability. The index that indicates the number of convex parts on the prepreg surface is an extreme value frequency of a surface geometry. When the prepreg has a 30 points/mm or less extreme value frequency of the surface geometry after being exposed to a desired temperature for 24 hours, the prepreg allows good interlayer slippage and comes to have excellent drapeability. The extreme value frequency is preferably 25 points/mm or less, and more preferably 15 points/mm or less. The surface geometry having an extreme value frequency in the above-mentioned ranges after the exposure causes the bending deformation of each layer of the prepreg laminate and interlayer slippage in a well-balanced manner and suppresses wrinkling when the prepreg laminate is made to conform to a three dimensional shape, thereby enabling the production of a fiber-reinforced plastic having high interlayer toughness, high mechanical properties, and less variation in quality.

Interposing the below-mentioned subduction prevention layer between the resin layer and the fiber layer is effective as a means for preventing the phenomenon in which the thermosetting resin contained in the resin layer shifts into the fiber layer when the prepreg is exposed to a desired temperature for a long time.

The prepreg is preferably such that, in the measurement of the coefficient of interlayer friction, the temperature region in which the coefficient of interlayer friction is 0.1 or less is in a temperature range of 40 to 80° C. In the measurement of the coefficient of interlayer friction, the temperature at which the coefficient of interlayer friction is preferably 0.08 or less, still more preferably 0.05 or less, is preferably present within a temperature range of 40 to 80° C. Because the temperature range of 40 to 80° C. is a stable region in which the curing reaction of the prepreg does not start, a step of making the prepreg laminate conform to a three dimensional shape is preferably carried out within this temperature range. Accordingly, in cases where no temperature region in which the coefficient of interlayer friction is 0.1 or less is present within a temperature range of 40 to 80° C., interlayer slippage is more unlikely to occur in the prepreg laminate and is likely to generate wrinkling when the prepreg laminate is shaped. In cases where the prepreg laminate generates wrinkling when shaped, the obtained fiber-reinforced plastic has lower strength and unstable quality.

One of the factors which increase the coefficient of interlayer friction is considered to be the resistance caused by contact between the thermoplastic resin which is contained in the resin layer and is insoluble in the thermosetting resin and the carbon fibers contained in the fiber layer. Accordingly, interposing the below-mentioned subduction prevention layer between the resin layer and the fiber layer such that the thermoplastic resin and the carbon fibers do not come into contact is effective also in order to reduce the coefficient of interlayer friction.

More preferably, the subduction prevention layer is such that, in the measurement of the coefficient of interlayer friction, the temperature at which the coefficient of interlayer friction is 0.1 or less is in a temperature region having a width of 20° C. or more. It is preferable that, in the measurement of the coefficient of interlayer friction, the temperature at which the coefficient of interlayer friction is preferably 0.08 or less, more preferably 0.05 or less, is present in a temperature region having a width of 20° C. or more. Incidentally, in the measurement of the coefficient of interlayer friction in the present invention, the coefficient of interlayer friction is measured at 10° C. intervals in a temperature range of 40 to 80° C., and when the coefficient of interlayer friction is 0.1 or less at three continuous temperatures, the width of the temperature region at which the coefficient of interlayer friction is 0.1 or less is defined as 20° C. or more.

This parameter has the following meaning. In the step of shaping a prepreg laminate, depending on the temperature control conditions, a temperature distribution often occurs in the prepreg laminate. For example, in cases where the prepreg laminate is heated with a one-side heating source, for example, an IR heater or the like, a temperature distribution occurs in the thickness direction of the prepreg laminate. In addition, for example, when the prepreg laminate heated in an oven or the like is shaped on a mandrel at room temperature, the prepreg laminate is cooled during shaping from the surface that is in contact with the mandrel, and a temperature distribution occurs inside the prepreg laminate. Therefore, in order to achieve a reproductive shaping step, the prepreg is preferably such that the temperature region in which the coefficient of interlayer friction is suitable has a width of 20° C. or more. It is still more preferable that the temperature region has a width of 30° C. or more.

In cases where the prepreg is measured for the coefficient of interlayer friction at 10° C. intervals in a temperature range of 40 to 80° C. at a pulling speed of 0.2 mm/min under a perpendicular stress of 0.1 bar, the temperature at which the increase rate of the coefficient of interlayer friction at a pulling displacement of 2 mm with respect to the coefficient of interlayer friction at a pulling displacement of 1 mm is within 20% is preferably present within a temperature range of 40 to 80° C. Here, the increase rate of the coefficient of interlayer friction refers to a rate that indicates how much the coefficient of interlayer friction at a pulling displacement of 2 mm has increased with respect to the coefficient of interlayer friction at a pulling displacement of 1 mm when the coefficient of interlayer friction is measured at a prescribed temperature as above-mentioned. The temperature at which the increase rate of the coefficient of interlayer friction is 20% or less is preferably within a range from 10° C. below to 10° C. above the temperature at which the coefficient of interlayer friction at a pulling displacement of 1 mm is the lowest. It is more preferable that the temperature at which the increase rate is 10% or less is present within a temperature range of 40 to 80° C. It is still more preferable that the width of the temperature region in which the increase rate is 20% or less is 20° C. or more, and it is still more preferable that the width of the temperature region in which the increase rate is 10% or less is 20° C. or more.

This parameter has the following meaning. Any variation in the coefficient of interlayer friction during shaping may lead to the unexpected generation of wrinkling. The smaller the increase rate is, the better it is, because a smaller increase in the coefficient of interlayer friction can prevent the generation of wrinkling even if the pulling displacement is larger. In addition, the larger the prepreg laminate is, the longer the distance up to the free end is, and thus a larger amount of interlayer slippage is required in order to eliminate the difference in distortion between the upper and under sides of the prepreg laminate, resulting in generating wrinkling more easily. Accordingly, the increase rate being small is a requirement suitable particularly for shaping a large member made of a prepreg laminate whose surface area is greater than 1 m$^2$.

Another aspect of the prepreg according to the present invention is a prepreg including: a fiber layer containing unidirectionally arranged carbon fibers impregnated with a thermosetting resin; and a resin layer existing on at least one side of the fiber layer and containing a thermosetting resin and a thermoplastic resin insoluble in the thermosetting resin; in which the prepreg contains the carbon fibers having an areal weight of fibers of 120 to 300 g/m$^2$ and has a weight fraction of resin of 25 to 50 mass %; and in which a temperature at which a displacement of a punch is 15 mm or more exists within a temperature range of 40 to 80° C., in which the displacement of the punch is measured at 10° C. intervals in a temperature range of 40 to 80° C., in which the displacement is caused after the punch comes into contact with a prepreg laminate and up to the time when wrinkling is generated on the prepreg laminate; in which the punch, which is in the shape of a hemisphere having a diameter of 30 mm, is pressed against the center of the prepreg laminate under an atmosphere temperature-controlled at a prescribed temperature, and pressed into the prepreg laminate such that the center of the punch passes through the center of the hole of a seat while the punch is pressed against the prepreg laminate; and in which the prepreg laminate, 150 mm square, is 16 sheets of the prepreg laid up in the form of [45/0/−45/90]$_{2S}$, sealed in a film which is being evacuated, and disposed on the seat, which has a hole having a diameter of 100 mm.

In a measurement method of evaluating the drapeability of a prepreg laminate quantitatively, a hemispherical punch is pressed against a planar prepreg laminate, and a measurement is made of the amount in which the punch has been pressed until the laminate can no longer conform to shape and generates wrinkling. In this measurement method, a universal tester equipped with a thermostatic oven is used to allow a punch directly connected to a load cell to be pressed against the prepreg at a prescribed temperature, whereby the displacement at which wrinkling is generated can be identified uniquely with a point at which the load turns lower or a point at which the stiffness obtained by dividing the load by the amount of displacement turns lower. Specifically, 150 mm square prepreg sheets are cut out in the 0° direction and the 45° direction, assuming that the orientation direction of the carbon fibers is the 0° direction; a total of 16 prepreg sheets are laid up in the form of [45/0/−45/90]$_{2S}$; the sealed spaces are evacuated for 30 minutes to increase the adhesiveness between the prepreg sheets; the prepreg sheets are sealed in a plastic heat-resistant bag film; while being evacuated, they are set on a seat with a hole having a diameter of 100 mm in a thermostatic oven controlled to a prescribed temperature at which measurements are made; the prepreg sheets undergo temperature control for 10 minutes; and a test is started. A hemispherical punch having a diameter of 30 mm is pressed into the prepreg laminate while the punch is pressed against the laminate at a speed of 5 mm/min such that the center of the punch passes through the center of the hole of the seat, to thereby measure that displacement of the punch which is caused after the punch comes into contact with the prepreg laminate and up to the time when wrinkling is generated on the prepreg laminate. The three dimensional shape formed by the punch pressing typifies various shape. Assuming that the above-mentioned measurement is made at 10° C. intervals in a temperature range of 40 to 80° C. and that the temperature at which the punch is displaced 15 mm or more after the punch comes into contact with the prepreg laminate and up to the time when wrinkling is generated on the prepreg laminate is within a temperature range of 40 to 80° C., the prepreg laminate can be shaped into a complicated shape without wrinkling at the temperature. Preferably, the temperature at which the punch is displaced 20 mm or more after the punch comes into contact with the prepreg laminate and up to the time when wrinkling is generated on the prepreg laminate is within a temperature range of 40 to 80° C. The displacement is more preferably 25 mm or more.

Still more preferably, the temperature region in which the punch is displaced 15 mm or more after the punch comes into contact with the prepreg laminate and up to the time when wrinkling is generated on the prepreg laminate ranges over a width of 20° C. or more within a temperature range of 40 to 80° C. In cases where a large member is shaped using a prepreg laminate having a low heat conductivity, a temperature difference between the parts thereof may be 20° C. or more, and thus the prepreg more preferably has high drapeability in a wide temperature region.

It is preferable that when prepreg sheets are quasi-isotropically laid up, formed into a laminate, and cured, and the laminate is processed into a planar specimen as defined in ASTM D7137/7137M-07, the laminate has a compressive strength after impact (CAI) of 250 MPa or more as measured in accordance with ASTM D7137/7137M-07. The compressive strength after impact is preferably 300 MPa or more, and still more preferably 350 MPa. Incidentally, the drop-impact step, which causes delamination in the specimen, is performed in accordance with ASTM D7136/7136M-07. The test is performed five times, and the average is taken as the compressive strength after impact (CAI). Higher CAI indicates higher impact characteristics, and such a laminate is suitable for the design requirements of an aircraft structural member and contributes to weight reduction of the member. Here, "quasi-isotropically laid up" means that the prepreg sheets are laid up while making small shifts in the fiber direction, whereby the orientation of fibers is isotropic in the entire laminate. In the present invention in particular, prepreg sheets are laid up with a difference of 45° each made between the fiber directions of adjacent four prepreg sheets such that the fiber directions are at −45°, 0°, 45°, and 90°, and thus isotropy is ensured.

It is preferable that when the prepreg sheets are unidirectionally laid up, formed into a laminate, and cured, the laminate has a fracture toughness $G_{IC}$ of 450 J/m$^2$ or more as measured in accordance with JIS K7086-1993. The fracture toughness $G_{IC}$ is more preferably 550 J/m² or more. The test is performed five times, and the average is taken as the fracture toughness $G_{IC}$. When the interlayer toughness is high, unexpected fracture in the direction out of the fiber orientation direction can be prevented. In particular, fracture of an aircraft structural member mostly occurs in mode I, where $G_{IC}$ is an important mechanical property. Here, "unidirectionally laid up" means that prepreg sheets are laid up to have the same fiber direction.

It is preferable that when the prepreg sheets are unidirectionally laid up, formed into a laminate, and cured, the laminate has a fracture toughness $G_{IIC}$ of 2200 J/m² or more as measured in accordance with JIS K7086-1993. The fracture toughness $G_{IIC}$ is more preferably 2900 J/m² or more. The test is performed five times, and the average is taken as the fracture toughness $G_{IIC}$. Similarly to $G_{IC}$, when the interlayer toughness is high, unexpected fracture in the direction out of the fiber orientation direction can be prevented. It is known that skin-stringer separation, which is one of the fracture modes of an aircraft structural member, occurs in mode II, where $G_{IIC}$ is as an important mechanical property. In addition, in order to improve CAI, it is effective to improve $G_{IIC}$ and thereby suppress delamination caused by an out-of-plane impact load. Also for the achievement of high impact strength, $G_{IIC}$ is an important mechanical property.

Next, specific aspects of the prepreg according to the present invention will be described.

The present inventors have found that a thermosetting resin shifts from the resin layer into the fiber layer, thereby increasing the ratio of the solid components, in other words, a thermoplastic resin, a solid hardener, and the like, contained in the resin layer with respect to the thermosetting resin, and that when slippage occurs between the layers in the shaping of the prepreg laminate, the interlayer friction is increased by the contact between the solid components in the resin layer or between the solid components and the fibers in the fiber layer, leading to the generation of wrinkling. The inventors have then found that, to prevent the thermosetting resin from shifting from the resin layer into the fiber layer, a subduction prevention layer can be formed between the resin layer and the fiber layer, thereby preventing the thermosetting resin from shifting from the resin layer into the fiber layer while the prepreg is stored and while the prepreg is heated-pressed to be shaped. The subduction prevention layer prevents the thermosetting resin from shifting from the resin layer into the fiber layer in a temperature region of room temperature to 100° C., more preferably in a temperature region of 40 to 80° C. In addition, the subduction prevention layer acts as a lubricant in the shaping of the prepreg laminate. In the shaping, the presence of the subduction prevention layer can reduce the contact between the solid components in the resin layer or between the solid components and the fibers in the fiber layer, facilitating interlayer slippage. In addition, the subduction prevention layer itself slips as a lubricant, thereby facilitating interlayer slippage further. The subduction prevention layer needs only to be present while the prepreg is stored and while it is shaped, and the resin constituting the subduction prevention layer is dispersed in the thermosetting resin at a formation temperature, for example, at about 180° C., and does not have to form a layer in the obtained fiber-reinforced plastic.

Preferable examples of materials that constitute the subduction prevent layer include solid resins. Specifically, preferable examples include: thermoplastic resins; thermosetting resins that are solid at room temperature; films, nonwoven fabrics, and particles made of mixtures thereof; and the like.

Preferably, the solid resin is solid at 40° C. and has a viscosity of 10,000 Pa·s or less at 80° C. The solid resin being solid at 40° C. enhances the subduction prevention effect. In addition, the solid resin having a viscosity of 1000 pa·s or less at 80° C. enhances the effect of the resin as a lubricant.

Further, as a solid resin used for the subduction prevention layer, a resin incompatible with a thermoplastic resin can be used, but using a resin compatible with a thermoplastic resin can afford a homogeneous thermosetting resin composition, and the obtained fiber-reinforced plastic is also expected to have higher breaking strength. Examples of effective solid components compatible with a thermoplastic resin include epoxy resins having a high molecular weight, particularly bisphenol A epoxy resins having a molecular weight of 500 or more, bisphenol F epoxy resins, biphenyl type epoxy resins, phenoxy resins, and the like.

As a means for providing the subduction prevention layer, a method can be exemplified which includes: obtaining a fiber layer containing unidirectionally arranged carbon fibers impregnated with a thermosetting resin; disposing a solid resin on at least one side of the fiber layer; and disposing, on the side on which the solid resin is disposed, a resin layer containing a thermosetting resin and a thermoplastic resin which is insoluble in the thermosetting resin.

A preferred aspect of the method of producing the prepreg according to the present invention is a production method including: obtaining a fiber layer containing unidirectionally arranged carbon fibers impregnated with a thermosetting resin; disposing, on at least one side of the fiber layer, a solid resin which is solid at 25° C. and has a viscosity of 10,000 Pa·s or less at 80° C.; and disposing, on the side on which the solid resin is disposed, a resin layer containing a thermosetting resin and a thermoplastic resin insoluble in the thermosetting resin; in which the obtained prepreg contains the carbon fibers having an areal weight of fibers of 120 to 300 g/m² and has a weight fraction of resin of 25 to 50 mass %. As used herein, a viscosity refers to a complex viscosity $\eta^*$ obtained by measurement using a dynamic viscoelastic measurement device (ARES-G2: made by TA Instruments, Inc.) with parallel plates having a diameter of 40 mm, on the basis of: simple heating at a temperature ramp rate of 2° C./min; a frequency of 0.5 Hz; and a gap of 1 mm.

EXAMPLES

Below, the present invention will be described in further detail through Examples. However, the present invention is not limited to the inventions described in Examples. The resin raw materials used in Examples, as well as the preparation methods and evaluation methods for prepregs and fiber-reinforced composite materials, will be shown below. Unless otherwise noted, the production environment and evaluation of the prepreg in Examples were performed in an atmosphere at a temperature of 25° C.±2° C. and a relative humidity of 50%.

(1) Measurement of Compressive Strength after Impact (CAI)

CAI was measured by the following operations (a) to (e).
(a) 16 unidirectional prepreg plies were laid up in the form of $[45/0/-45/90]_{2s}$.
(b) The prepreg laminate was tightly covered with a nylon film, then heated in an autoclave to 180° C. at a temperature ramp rate of 1.5° C./min, and heat-pressurized and cured at a temperature of 180° C. and a pressure of 7 kg/cm² for 2 hours, thereby forming a quasi-isotropic material (carbon-fiber-reinforced composite material).

(c) Assuming that the 0° direction is the length direction, a CAI specimen having a length of 150±0.25 mm and a width of 100±0.25 mm was cut out from the quasi-isotropic material.
(d) In accordance with the test method defined in ASTM D7136/7136M-07, an impact load was imparted to the CAI specimen using drop-weight. Then, the damaged area was measured using an ultrasonic inspection method. The energy of the impact given to the panel was calculated from the average thickness of nine points of the formed plate, and was set at 28.4 J for all specimens.
(e) In accordance with the test method defined in ASTM D7137/7137M-07, the CAI specimen to which impact load had been imparted according to the above-mentioned procedures was measured for CAI strength, using "INSTRON (registered trademark)" Universal Tester, Model 4208. The number of measurement specimens was 5, and the average was taken as the CAI strength.

(2) Measurement of Mode-I Interlayer Toughness ($G_{IC}$)

$G_{IC}$ was measured through the following operations (a) to (f) in accordance with JIS K7086 (1993).
(a) 16 unidirectional prepreg plies were laid up to have the same fiber direction. However, in order to cause initial cracking in the laminate's midplane (between the eighth ply and the ninth ply), a film made of fluorine resin having a thickness of 12.5 μm was inserted 40 mm in the direction of 0° from an end portion of the laminate.
(b) The prepreg laminate was tightly covered with a nylon film, then heated in an autoclave to 180° C. at a temperature ramp rate of 1.5° C./min, and heat-pressurized and cured at a temperature of 180° C. and a pressure of 7 kg/cm² for 2 hours, thereby forming a unidirectionally reinforced material (carbon-fiber-reinforced composite material).
(c) Defining the 0° direction as the length direction, the unidirectionally reinforced material (carbon-fiber-reinforced composite material) obtained in (b) was cut to a width of 20 mm and a length of 195 mm to obtain a specimen for an interlayer toughness test. For this, the material was cut such that the fiber direction was parallel to the longitudinal direction of the specimen.
(d) In accordance with JIS K7086 (1993), a block for pin loading (25 mm in length, made of aluminum) was attached to one end of the specimen (film-sandwiched side).
(e) A white coating material was applied to both surfaces of the specimen to facilitate the observation of crack growth.
(f) Using the specimen, $G_{IC}$ measurement was performed through the following procedures.

In accordance with JIS K7086 (1993), Appendix 1, the test was performed using "INSTRON (registered trademark)", Model 5565. The crosshead speed was 0.5 mm/min until the crack growth reached 20 mm, and was 1 mm/min after 20 mm was reached. In accordance with JIS K7086 (1993), $G_{IC}$ ($G_{IC}$ in the early stage of crack growth) was calculated from the load, displacement, and crack length. The number of the measured specimens was 5, and the average was taken as $G_{IC}$.

(3) Measurement of Mode-II Interlayer Toughness ($G_{IIC}$)

$G_{IIC}$ was measured through the following operations (a) to (e) in accordance with JIS K7086 (1993).
(a) 16 unidirectional prepreg plies were laid up to have the same fiber direction. However, in order to cause initial cracking in the laminate's midplane (between the eighth ply and the ninth ply), a film made of fluorine resin having a thickness of 12.5 μm was inserted 40 mm in the direction of 0° from an end portion of the laminate.
(b) The prepreg laminate was tightly covered with a nylon film, then heated in an autoclave to 180° C. at a temperature ramp rate of 1.5° C./min, and heat-pressurized and cured at a temperature of 180° C. and a pressure of 7 kg/cm² for 2 hours, thereby forming a unidirectionally reinforced material (carbon-fiber-reinforced composite material).
(c) Defining the 0° direction as the length direction, the unidirectionally reinforced material (carbon-fiber-reinforced composite material) obtained in (b) was cut to a width of 20 mm and a length of 195 mm to obtain a specimen for an interlayer toughness test. The material was cut such that the fiber direction was parallel to the longitudinal direction of the specimen.
(d) A white coating material was applied to both surfaces of the specimen to facilitate the observation of crack growth.
(e) Using the specimen, Gm measurement was performed through the following procedures.

In accordance with JIS K7086 (1993), Appendix 2, the test was performed using "INSTRON (registered trademark)", Model 5565. The crosshead speed was 1 mm/min. In accordance with JIS K7086 (1993), $G_{IIC}$ corresponding to the critical load in the early stage of crack growth ($G_{IIC}$ in the early stage of crack growth) was calculated from the load, displacement, and crack length. The number of the measured specimens was 5, and the average was taken as $G_{IIC}$.

(4) Measurement of Coefficient of Interlayer Friction of Prepreg

The coefficient of interlayer friction was measured through the following operations (a) to (d).
(a) As shown in FIG. 1, defining the 0° direction as the length direction, on a first-layer prepreg 4 cut to a width of 40 mm and a length of 150 mm, a second-layer prepreg 3 cut to a width of 30 mm and a length of 150 mm was laid up such that they overlapped in an area having a width of 30 mm and a length of 60 mm. Further, a prepreg 5 to serve as a spacer having a width of 30 mm and a length of 20 mm was laid up to contact the overlapping part of the second layer, and then a third-layer prepreg 4 having a width of 40 mm and a length of 150 mm was laid up to overlap the first layer. Subsequently, a release paper 2 having a width of 40 mm×a length of 30 mm was attached to overlap the outer sides of the first layer and the third layer.
(b) To the area (an area having a width of 30 mm and a length of 70 mm as a whole) whose longitudinal sides are each 5 mm inward from those of the 30 mm wide and 80 mm long area formed by the overlapping parts and the spacer, a constant perpendicular load of 21 N (a pressure of 0.1 bar) was applied using the pressure plate 1 having a heating source the temperature controlled at a prescribed temperature.
(c) After 10 minutes from the start of perpendicular load application, the second-layer prepreg 3 was pulled out at a pulling speed of 0.2 mm/min in the fiber direction, and the pulling load was measured. In this regard, together with the pulling out, the area of the overlapping part of the second-layer prepreg 3 that receives the perpendicular load decreases. Therefore, the pulling load divided by twice the perpendicular load received by the area of the overlapping part converted into a pulling displacement, that is, 21 N×(60 mm–the pulling displacement)/(70 mm–the pulling displacement)×2, is taken as the coefficient of interlayer friction. The coefficients of interlayer friction after 5 minutes and 10 minutes from the start of pulling out, that is, at pulling displacements of 1 mm and 2 mm, were measured five times, and the average of the five measurement values were taken as the values of the coefficients of interlayer friction at the respective displacements.

(d) The measurements in (a) to (c) above were carried out at 10° C. intervals in a temperature range of 40 to 80° C.

(5) Measurement of Surface Geometry of Prepreg

In accordance with the following operations (a) to (c), a prepreg which had been exposed for 24 hours was measured for an extreme value frequency of a surface geometry along a straight line perpendicular to the fibers.

(a) In accordance with the procedure (4) above, a coefficient of interlayer friction of the prepreg at 1 mm displacement was measured at 10° C. intervals in a temperature range of 40 to 80° C., and a temperature at which the coefficient of interlayer friction was the lowest was determined. Five pieces, each having a 20 mm square size, were cut out of the prepreg substantially evenly in the cross direction such that the pieces included both ends of the prepreg, and the release paper was peeled off. In an oven in which the temperature was controlled at a temperature at which the coefficient of interlayer friction determined as above-mentioned was the lowest, the cut-out five sheets of the prepreg were exposed for 24 hours, the face from which the release paper had been peeled off being the upper side, and then the sheets were cooled to room temperature without contacting the surfaces of the prepreg sheets.

(b) That surface of the prepreg from which the release paper had been peeled off was measured by depth synthesis using a digital microscope VHX500 made by Keyence Corporation to obtain the height profile of the surface shown in FIG. 2. At this time, the prepreg surface was scanned along the direction perpendicular to the direction in which the carbon fibers were oriented, and surface heights were obtained at 1.1 μm intervals along the straight line in a range corresponding to the length of 1.1 mm. The measurement was carried out five times on each of the five prepreg sheets having a 20 mm square size, totaling 25 measurements.

(c) As shown in FIG. 2, the scanned points 6 were obtained in the scanning direction; the points at which the increase and decrease in surface height turned inversely were treated as extreme values 7; and the number of the extreme values 7 was divided by the scanning length to determine the number per 1 mm of the extreme values. The number per 1 mm of the extreme values which had been determined from 25 measurements in total was averaged to determine the extreme value frequency of the surface geometry.

(6) Measurement of Drapeability of Prepreg Laminate

Figure 3:
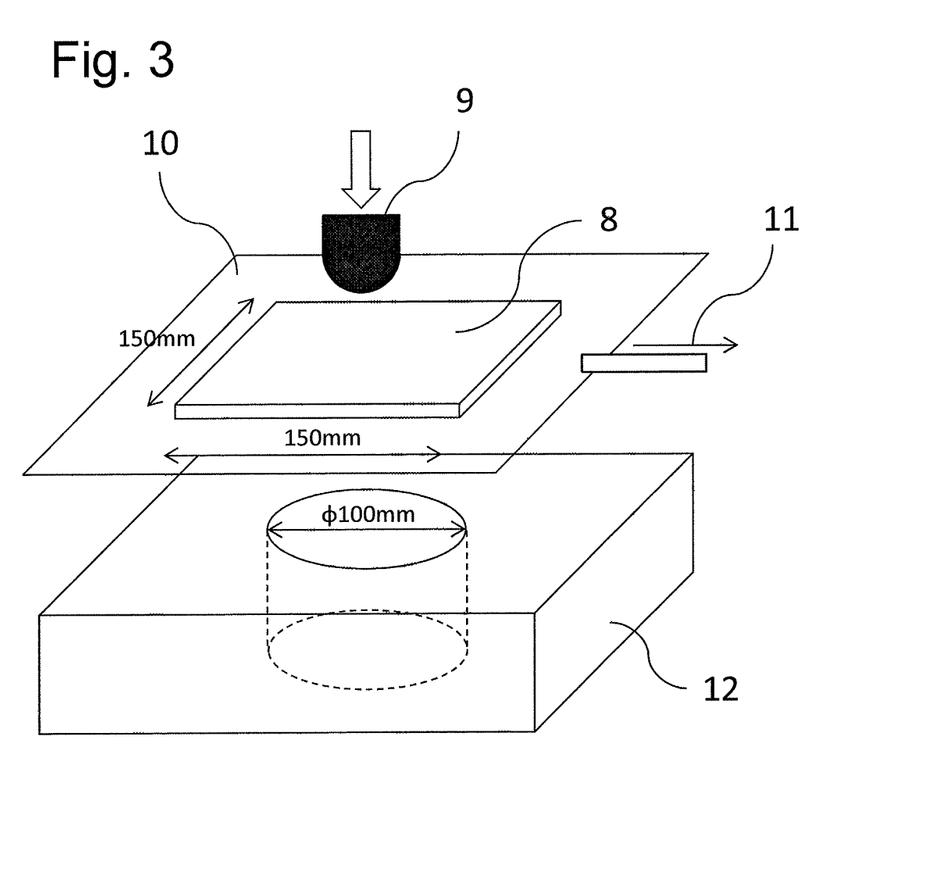
FIG. 3 is a schematic view showing a drapeability measurement method.

In accordance with the following operations (a) to (e), the prepreg laminate was measured for drapeability. The schematic view of the measurement is shown in FIG. 3.

(a) Prepreg sheets, 150 mm square, were cut out in the 0° direction and the 45° direction; then a total of 16 prepreg sheets were laid up such that the laying-up pattern was $[45/0/-45/90]_{2S}$; and the sealed spaces were evacuated for 30 minutes to obtain the prepreg laminate 8.

(b) In the thermostatic oven of the universal tester, a hemispherical punch 9 having a diameter of 30 mm was disposed above a seat 12 with a hole having a diameter 100 mm such that the center of the punch 9 passed through the center of the hole of the seat 12, and the oven was controlled to a prescribed temperature.

(c) The prepreg laminate 8 obtained in (a) was sealed in a heat-resistant nylon-made bag film 10; while the evacuation 11 was being carried out, the bag was set on a seat 12 in the thermostatic oven controlled to a prescribed temperature; the thermostatic oven was closed with the end of the punch 9 in contact with the center of the prepreg laminate 8; and 10 minutes later, the test was started.

(d) The punch was pressed into the hole of the seat 12 while being pressed against the prepreg laminate 8 at a speed of 5 mm/min, to thereby measure that displacement of the punch 9 which was caused after the punch 9 came into contact with the prepreg laminate 8 and up to the time when wrinkling was generated on the prepreg laminate 8.

(e) The measurements in (a) to (d) above were carried out at 10° C. intervals in a temperature range of 40 to 80° C.

(7) Hot-Forming Test

A hot-forming test was performed, and the wrinkles were evaluated through the following operations (a) to (d).

(a) Assuming that the 0° direction was the direction in which the fibers were oriented, 16 prepreg layers each having a width of 15 cm and a length of 15 cm were laid up so as to have a laying-up pattern of $[45/-45/0/90]_{2S}$.

Figure 4:
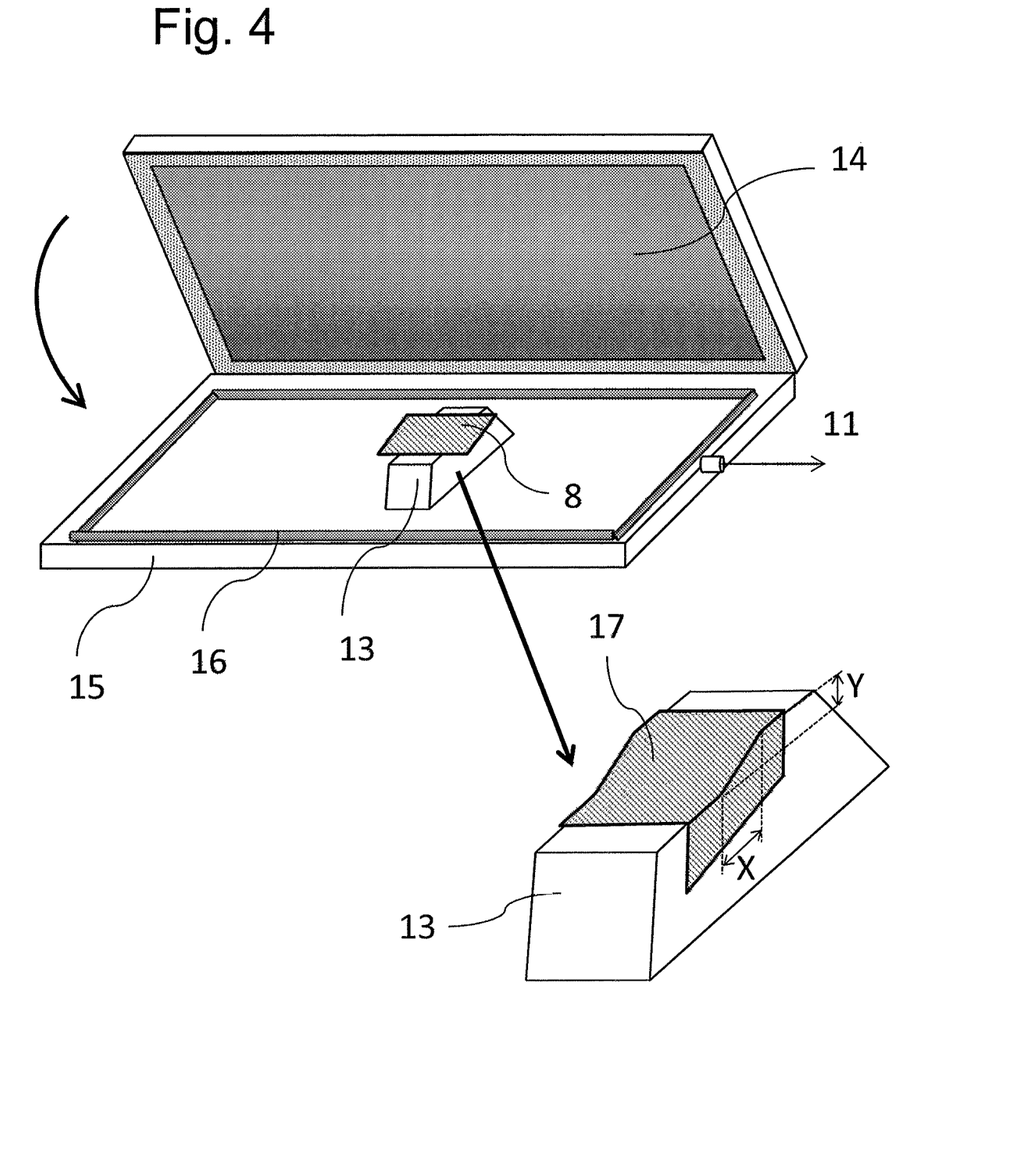
FIG. 4 is a schematic view showing a hot-forming test.

(b) As shown in FIG. 4, a shaping mold 13 which was 5 cm wide and 10 cm long and had a ramp having a length X of 6 cm and a height Y of 0.3 cm and whose edges all have a radius (R) of 5 mm was set on a frame 15 having a silicone rubber 14 and a seal 16, and the temperature was controlled, for 30 minutes, in an oven controlled to the temperature at which the coefficient of interlayer friction measured in the method (1) was the lowest.

(c) The prepreg laminate 8 was disposed on the shaping mold 13, and temperature-controlled in the oven for 10 minutes, followed by carrying out the evacuation 11 from the frame 15 over 150 seconds. As a result, a shaped prepreg laminate 17, with both ends of the prepreg laminate 8 being bent at 90°, was obtained.

(d) The wrinkles formed in the inner side of the bent portions of the shaped prepreg laminate 17 was rated into the following three types: deep wrinkles, fine wrinkles that would disappear as a result of forming, and no wrinkles.

(8) Evaluation of Insolubility of Thermoplastic Resin Particles

The unidirectionally reinforced material produced in (2) (c) was cut along the cross-section in the 0° direction; the cross-section was ground until a clear interface was seen between the reinforcing fibers and the thermosetting resin; and the surface was observed under an optical microscope to observe thermoplastic resin particles in the resin layer present between the fiber layers. At this time, in cases where a clear interface was seen between the granular thermoplastic resin particles and the surrounding thermosetting resin, the particles were considered to be insoluble. Contrarily, when the thermoplastic resin particles were not distinguishable from the surrounding thermosetting resin, the particles were considered to be soluble.

Example 1

(a) Preparation of Thermoplastic Resin Particles

Ninety parts by mass of a transparent polyamide (product name: "GRILAMID (registered trademark)"—TR55, manufactured by EMSER Werke), 7.5 parts by mass of an epoxy resin (product name: "EPIKOTE (registered trademark)" 828, manufactured by Shell Petrochemical Co., Ltd.), and 2.5 parts by mass of a hardener (product name: "TOHMIDE (registered trademark)" #296, manufactured by Fuji Kasei Kogyo Co., Ltd.) were added to a solvent mixture containing 300 parts by mass of chloroform and 100 parts by mass of methanol, thereby giving a uniform solution. Next, the obtained uniform solution was atomized using a coating spray gun, and then sprayed toward the liquid surface of 3,000 parts by mass of n-hexane. The precipitated solid was separated by filtration, sufficiently washed with n-hexane, and then vacuum-dried at 100° C. for 24 hours, thereby giving spherical epoxy modified nylon particles. The epoxy modified nylon particles were classified using a CCE classifier manufactured by CCE Technologies, Inc. The 90 vol % particle size of the obtained particles was 28 μm, and the CV value was 60%. In addition, as a result of observation under a scanning electron microscope, the obtained powder was found to be in the form of fine particles having a sphericity of 96 with an average particle size of 14 μm.

(b) Preparation of Resin Composition (1) After 13 parts by mass of polyethersulfone ("SUMIKAEXCEL (registered trademark)" PES5003P) was added to and dissolved in 60 parts by mass of tetraglycidyl-diaminodiphenylmethane ("ARALDITE (registered trademark)" MY9655) and 12.6 parts by mass of bisphenol A liquid epoxy resin ("EPON (registered trademark)" 825) in a kneader, 45 parts by mass of diaminodiphenyl sulfone ("ARADUR (registered trademark)" 9664-1) was then added as a hardener, and the resulting mixture was kneaded, thereby giving a thermosetting resin composition (A) for a fiber layer.

(2) After 16 parts by mass of PES5003P was added to and dissolved in 60 parts by mass of "ARALDITE (registered trademark)" MY9655 and 40 parts by mass of "EPON (registered trademark)" 825 in a kneader, 80 parts by mass of the thermoplastic particles produced in (a) was then added; the resulting mixture was kneaded; 45 parts by mass of "ARADUR (registered trademark)" 9664-1 was then added as a hardener; and the resulting mixture was kneaded, thereby giving a thermosetting resin composition (B) for a resin layer.

(c) Production of Prepreg

The thermosetting resin composition (A) produced in (b) (1) was applied to a release paper using a knife coater, thereby producing two resin films (A) each having a resin content of 30 g/m². Next, the two resin films (A) were each laid up on each side of a unidirectionally arranged carbon fiber sheet ("TORAYCA (registered trademark)" T800S-12K), and the resin was impregnated into the carbon fiber sheet by means of heating and pressurizing, thereby producing a fiber layer composed of a unidirectional carbon fiber sheet and the thermosetting resin composition (A). Then, the solid epoxy resin "j ER (registered trademark) 1001" was pulverized using a mortar so as to become powder, 10 g/m² of which was scattered over each of both surfaces of the previously produced fiber layer using a screen of 32 μm meshes. In this regard, the jER (registered trademark) 1001 was solid at 25° C., and the viscosity thereof achieved under the conditions: a temperature ramp rate of 2° C./min, an oscillation frequency of 0.5 Hz, and parallel plates (having a diameter of 40 mm) was 120 Pa·s at 80° C. Then, both sides were sandwiched by release paper, sealed in a bag film, and evacuated for 5 minutes while temperature-controlled at 60° C., to thereby produce a unidirectional carbon-fiber-reinforced prepreg precursor with a solid epoxy resin layer disposed on both sides of the fiber layer.

Next, the thermosetting resin composition (B) produced in (b) (2) was applied to a release paper using a knife coater, thereby producing two resin films (B) each having a resin content of 30 g/m². From the previously produced unidirectional carbon fiber-reinforced prepreg precursor, the release paper was peeled off, and then both of the sides were laid with the resin film (B), sealed in a bag film, and evacuated for 5 minutes while temperature-controlled at 50° C. In this manner, a unidirectional carbon-fiber-reinforced prepreg, in which a solid epoxy resin layer and a resin layer containing thermoplastic resin particles were disposed in this order on each side of a fiber layer, the areal weight of fibers was 270 g/m², and the weight fraction of resin of the matrix resin was 34 mass %, was produced.

Using the obtained prepreg, interlayer friction measurement, surface observation, and a shaping test were performed in accordance with the above-mentioned procedures. In addition, a carbon fiber composite material was produced using the obtained prepreg. The results are shown in Table 1 and Table 2.

Comparative Example 1

(a) Preparation of Resin Composition

After 13 parts by mass of PES5003P was added to and dissolved in 60 parts by mass of "ARALDITE (registered trademark)" MY9655 and 40 parts by mass of "EPON (registered trademark)" 825 in a kneader, 45 parts by mass of "ARADUR (registered trademark)" 9664-1 was then added as a hardener, and the resulting mixture was kneaded, thereby giving a thermosetting resin composition (C).

(b) Production of Prepreg

The thermosetting resin composition (C) produced in (a) was applied to release paper using a knife coater, thereby producing two resin films each having a resin content of 40 g/m². Next, the produced two resin films were each laid up on each side of a unidirectionally arranged carbon fiber sheet ("TORAYCA (registered trademark)" T800S-12K), and the resin was impregnated into the carbon fiber sheet by means of heating and pressurizing on the same conditions as in Example 1, thereby producing a unidirectional carbon-fiber-reinforced prepreg. Further, the thermosetting resin composition (B) produced in Example 1 (b) (2) was applied to release paper using a knife coater, thereby producing two resin films each having a resin content of 30 g/m². The resin films were each laid up on each side of the unidirectional carbon-fiber-reinforced prepreg produced above, and the resin was laid up by means of heating and pressurizing. In this manner, a unidirectional carbon-fiber-reinforced prepreg, in which a resin layer containing thermoplastic resin particles was disposed on each side of a fiber layer, the areal weight of fibers was 270 g/m², and the weight fraction of resin of the matrix resin was 34 mass %, was produced.

Using the obtained prepreg, interlayer friction measurement, surface observation, and a shaping test were performed. In addition, a carbon fiber composite material was produced using the obtained prepreg. The results are shown in Table 1 and Table 2.

Comparative Example 2

(a) Preparation of Resin Composition

After 16 parts by mass of PES5003P was added to and dissolved in 60 parts by mass of "ARALDITE (registered trademark)" MY9655 and 40 parts by mass of "EPON (registered trademark)" 825 in a kneader, 45 parts by mass of "ARADUR (registered trademark)" 9664-1 was then added as a hardener, and the resulting mixture was kneaded, thereby giving a thermosetting resin composition (D).

(b) Production of Prepreg

The thermosetting resin composition (C) produced in Comparative Example 1 (a) was applied to a release paper using a knife coater, thereby producing two resin films each having a resin content of 40 g/m². Next, the produced two resin films were each laid up on each side of a unidirectionally arranged carbon fiber sheet ("TORAYCA (registered trademark)" T800S-12K), and the resin was impregnated into the carbon fiber sheet by means of heating and pressurizing, thereby producing a unidirectional carbon-fiber-reinforced prepreg. Further, the thermosetting resin composition (D) produced in (a) which did not contain thermoplastic particles was applied to release paper using a knife coater, thereby producing two resin films each having a resin content of 30 g/m². The resin films were each laid up on each side of the unidirectional carbon-fiber-reinforced prepreg produced above, and the resin was laid up by means of heating and pressurizing. In this manner, a unidirectional carbon-fiber-reinforced prepreg, in which a resin layer not containing thermoplastic resin particles was disposed on each side of a fiber layer, the areal weight of fibers was 270 g/m², and the weight fraction of resin of the matrix resin was 34 mass %, was produced.

Using the obtained prepreg, interlayer friction measurement, surface observation, and a shaping test were performed. In addition, a carbon fiber composite material was produced using the obtained prepreg. The results are shown in Table 1 and Table 2.

TABLE 1

|  | Temperature (° C.) | Example 1 | Comparative Example 1 | Comparative Example 2 |
| --- | --- | --- | --- | --- |
| Coefficient of Interlayer Friction @ 1 mm Displacement | 40 | 1.04 | 1.05 | 0.28 |
|  | 50 | 0.12 | 0.48 | 0.07 |
|  | 60 | 0.05 | 0.22 | 0.06 |
|  | 70 | 0.06 | 0.27 | 0.08 |
|  | 80 | 0.06 | 0.25 | 0.09 |
| Coefficient of Interlayer Friction @ 2 mm Displacement | 40 | 0.96 | 1.05 | 0.41 |
|  | 50 | 0.13 | 0.58 | 0.12 |
|  | 60 | 0.05 | 0.28 | 0.09 |
|  | 70 | 0.07 | 0.38 | 0.13 |
|  | 80 | 0.06 | 0.32 | 0.19 |
| Measurement of Drapeability of Prepreg Laminate (mm) | 40 | 6.3 | 6.6 | 8.0 |
|  | 50 | 12.7 | 9.8 | 12.3 |
|  | 60 | 17.2 | 12.1 | 14.5 |
|  | 70 | 17.0 | 13.5 | 13.8 |
|  | 80 | 17.1 | 14.7 | 11.8 |

TABLE 2

| Items | Units | Example 1 | Comparative Example 1 | Comparative Example 2 |
| --- | --- | --- | --- | --- |
| Compressive Strength After Impact (CAI) | MPa | 310 | 300 | 150 |
| Mode-I Interlayer Toughness ($G_{IC}$) | J/m² | 560 | 570 | 350 |
| Mode-II Interlayer Toughness ($G_{IIC}$) | J/m² | 2250 | 2190 | 600 |
| Extreme Value Frequency of Surface Geometry along Straight Line Perpendicular to Fibers of Prepreg which has been Exposed for 24 Hours | points/mm | 24 | 34 | 8 |
| Hot-Forming Test Evaluation of Wrinkles | — | no wrinkle | deep wrinkles | fine wrinkles |
| Evaluation of Insolubility of Thermoplastic Resin Particles | — | insoluble | insoluble | — |

DESCRIPTION OF REFERENCE SIGNS

1: Pressure plate
2: Release paper
3: Second-layer prepreg
4: First-layer, third-layer prepreg
5: Spacer prepreg
6: Scanned points
7: Extreme values
8: Prepreg laminate
9: Punch
10: Bag film
11: Evacuation
12: Seat
13: Shaping mold
14: Silicone rubber
15: Frame
16: Seal
17: Shaped prepreg laminate

The invention claimed is:

1. A prepreg comprising:
   a fiber layer containing unidirectionally arranged carbon fibers impregnated with a thermosetting resin; and
   a resin layer existing on at least one side of the fiber layer and containing a thermosetting resin and a thermoplastic resin insoluble in the thermosetting resin;
   wherein a subduction prevention layer is formed between the resin layer and the fiber layer, wherein the subduction prevention layer comprises a solid resin which is solid at 25° C. and has a viscosity of 10,000 Pa·s or less at 80° C.;
   wherein the prepreg contains the carbon fibers having an areal weight of fibers of 120 to 300 g/m² and has a weight fraction of resin of 25 to 50 mass %; and
   wherein an extreme value frequency of a surface geometry along a straight line perpendicular to the fibers of the prepreg is 30 points/mm or less when the prepreg has been exposed, for 24 hours, to a temperature at which a coefficient of interlayer friction is the lowest;
   wherein when the coefficient of interlayer friction of the prepreg is measured by pulling out the prepreg which is sandwiched between two prepreg sheets at 10° C. intervals in a temperature range of 40 to 80° C. under the conditions: a pulling speed of 0.2 mm/min, a perpendicular stress of 0.1 bar, and a pulling displacement of 1 mm.

2. The prepreg according to claim 1, wherein the thermoplastic resin is in the form of particles.

3. The prepreg according to claim 1, wherein a temperature region in which the coefficient of interlayer friction is 0.1 or less ranges over a width of 20° C. or more, wherein, using sheets of the prepreg which are laid up, the coefficient of interlayer friction is measured at 10° C. intervals in a temperature range of 40 to 80° C. under the conditions: a pulling speed of 0.2 mm/min, a perpendicular stress of 0.1 bar, and a pulling displacement of 1 mm.

4. The prepreg according to claim 1, wherein a temperature at which an increase rate of the coefficient of interlayer friction is within 20% is present within a temperature range from 10° C. below to 10° C. above a temperature at which the coefficient of interlayer friction is the lowest at a pulling displacement of 1 mm,
   wherein, using sheets of the prepreg which are laid up, the coefficient of interlayer friction is measured at 10° C. intervals in a temperature range of 40 to 80° C. under the conditions: a pulling speed of 0.2 mm/min and a perpendicular stress of 0.1 bar,
   wherein the increase rate is a rate of the coefficient of interlayer friction at a pulling displacement of 2 mm to the coefficient of interlayer friction at a pulling displacement of 1 mm.

5. The prepreg according to claim 1, wherein the sheets of the prepreg which are quasi-isotropically laid up and formed have a compressive strength after impact of 250 MPa or more as measured in accordance with ASTM D7137/7137M-07.

6. The prepreg according to claim 1, wherein the sheets of the prepreg which are unidirectionally laid up and formed into a laminate have a fracture toughness $G_{IC}$ of 450 J/m² or more as measured in accordance with JIS K7086-1993.

7. The prepreg according to claim 1, wherein the sheets of the prepreg which are unidirectionally laid up and formed into a laminate have a fracture toughness $G_{IIC}$ of 2,200 J/m² or more as measured in accordance with JIS K7086-1993.

* * * * *